United States Patent
Hinterberger et al.

(10) Patent No.: US 11,309,719 B2
(45) Date of Patent: Apr. 19, 2022

(54) BATTERY FOR A MOTOR VEHICLE AND METHOD FOR OPERATING A BATTERY

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 290 days.

(21) Appl. No.: 16/353,271

(22) Filed: Mar. 14, 2019

(65) Prior Publication Data

US 2019/0288524 A1    Sep. 19, 2019

(30) Foreign Application Priority Data

Mar. 15, 2018 (DE) .......................... 10 2018 203 999.2

(51) Int. Cl.
*H02J 7/00* (2006.01)
*B60L 50/64* (2019.01)
*B60L 58/24* (2019.01)

(52) U.S. Cl.
CPC ............ *H02J 7/0021* (2013.01); *B60L 50/64* (2019.02); *B60L 58/24* (2019.02); *B60Y 2200/91* (2013.01); *B60Y 2400/112* (2013.01)

(58) Field of Classification Search
CPC ...... H02J 7/0024; H02J 7/0071; H02J 7/1423; H02J 7/0021; H02J 7/0013; H02J 7/0014; H02J 7/0019; H02J 7/0016; B60L 50/64; B60L 58/24; B60Y 2200/91; B60Y 2400/112

(Continued)

(56) References Cited

U.S. PATENT DOCUMENTS

2004/0126641 A1*  7/2004  Pearson ............ H01M 8/04567
                                                                429/413
2013/0026989 A1*  1/2013  Gibbs ..................... B60L 50/64
                                                                320/116

(Continued)

FOREIGN PATENT DOCUMENTS

DE    102008053074 A1    1/2010
DE    102008060936 A1    6/2010

(Continued)

OTHER PUBLICATIONS

German Examination Report dated Sep. 10, 2018 in corresponding German Application No. 102018203999.2; 32 pages.

*Primary Examiner* — Richard Isla
*Assistant Examiner* — Mohammed J Sharief
(74) *Attorney, Agent, or Firm* — Maier & Maier, PLLC

(57) ABSTRACT

A battery for a motor vehicle, having multiple battery cells which include respective battery cell housings with electric terminals via which the battery cells are electrically connected to one another. In the battery cell housings, in each case a cell branch connecting the terminals, with a galvanic cell, is arranged, and in each case several of the battery cells are connected to one another in parallel connection to form respective cell blocks. Each cell branch includes a switching element for opening and closing the cell branch; the battery has a control device which is configured in order to actuate the switching elements of the cell branches for opening or closing the switching elements as a function of a performance requirement of an electric drive of the motor vehicle.

8 Claims, 3 Drawing Sheets

(58) Field of Classification Search
USPC .................................. 320/116, 117, 122, 126
See application file for complete search history.

(56) References Cited

U.S. PATENT DOCUMENTS

| | | | | |
|---|---|---|---|---|
| 2013/0214740 | A1* | 8/2013 | Emori | B60L 58/19 |
| | | | | 320/118 |
| 2014/0349146 | A1* | 11/2014 | Dittmann | H01M 10/0445 |
| | | | | 429/50 |
| 2015/0372515 | A1* | 12/2015 | Bulur | H02J 7/0026 |
| | | | | 320/112 |
| 2016/0141896 | A1* | 5/2016 | Brandon | H01M 10/425 |
| | | | | 307/72 |
| 2018/0191176 | A1* | 7/2018 | Sherstyuk | H02J 7/008 |

FOREIGN PATENT DOCUMENTS

| | | |
|---|---|---|
| DE | 102011113798 A1 | 5/2012 |
| DE | 102011054790 A1 | 4/2013 |
| WO | 03/041206 A1 | 5/2003 |

* cited by examiner

BATTERY FOR A MOTOR VEHICLE AND METHOD FOR OPERATING A BATTERY

FIELD

The invention relates to a battery for a motor vehicle. The invention moreover relates to a method for operating such a battery and to a motor vehicle with such a battery.

BACKGROUND

As a result of the increasing electrification of motor vehicles, batteries, for example, based on lithium ions and the like, are increasingly used.

DE 10 2011 113 798 A1 discloses a battery for a motor vehicle, which comprises multiple battery cells. Outside of the battery cells, switching modules are arranged, by means of which the individual battery cells can be deactivated as needed.

DE 10 2008 060 936 A1 describes a battery unit consisting of multiple modules connected in parallel, which can be switched on and off individually depending on the state of charge.

DE 10 2008 053 074 A1 discloses a rapid switching device for a high-power battery in a DC microgrid. The rapid switching device can switch individual battery modules which are connected in parallel to one another.

SUMMARY

The aim of the present invention is to provide a solution by means of which a battery can be used particularly efficiently in a motor vehicle.

This aim is achieved by a battery for a motor vehicle and by a method for operating a battery having the features of the independent claims. Advantageous designs with appropriate and non-trivial developments of the invention are indicated in the dependent claims.

The battery according to the invention for a motor vehicle comprises multiple battery cells each comprising respective battery cell housings with electric terminals via which the battery cells are electrically connected to one another, wherein, in the battery cell housings, in each case a cell branch connecting the terminals, with a galvanic cell, is arranged, and several of the battery cells in each case are connected to one another in parallel connection to form respective cell blocks. Each cell branch here has a switching element for opening and closing the cell branch, wherein the battery has a control device which is configured to actuate the switching elements of the cell branches for opening or closing the switching elements as a function of a performance requirement of an electric drive of the motor vehicle.

In the sense of the invention, a battery is understood to be an interconnection of multiple similar galvanic cells or elements. The term covers both primary cells and secondary cells. Battery cells can also be so-called solid state cells as well as conventional galvanic cells such for example as lithium ion cells or the like. In the same way, the battery cells can also be fuel cells. Said switching elements can be electronic switching elements, that is to say, for example, field effect transistors or diodes. But the switching elements can also be electromechanical switches, for example, relays. In switching elements, it is essential that they can switch the respective cell branches with the galvanic cells, that is to say that they can switch the respective branches either to conduct electricity or can electrically separate them.

In the battery according to the invention, it is essential that the switching elements are integrated in the individual battery cells. Thus, by means of the battery according to the invention, it is possible to control individual energy flows at the level of the battery cell. In principle, both a central control of the switching on and switching off of the battery cells as well as decentralized control in that regard are possible. The battery according to the invention is constructed by the integration of the switching elements in the battery cells in a particularly space-saving manner, since no elements have to be stuck onto the battery cells in order to switch the individual battery cells on or off. Overall, this results also in less wiring than in conventional batteries. This also results in substantially fewer defect sources overall in the battery according to the invention, since the individual battery cells themselves already have the essential components integrated in them, which are needed for the different switching operations of the battery cells. Thus, in the battery according to the invention, for example, the battery cells do not also have to be connected to printed circuit boards or the like, since the control device is integrated in the battery, preferably in a decentralized manner via individual control units, for example, in the form of microcontrollers, in the battery cells.

By means of the battery according to the invention, it is possible to provide as needed an appropriate performance by means of the battery based on a performance requirement of an electric drive of the respective motor vehicle in which the battery is used. The individual battery cells of the battery can be switched on or off depending on the need to supply energy or power to the respective electric drive of the motor vehicle. Thus, at the smallest level of the battery, namely at the level of the battery cell, it is possible to provide energy flows as needed, in order to supply the respective electric drive of the motor vehicle with appropriate energy.

An advantageous embodiment of the invention provides that the control device is configured to actuate the switching elements of the cell branches for opening or closing the switching elements as a function of a respective temperature of the battery cells. The switching on or off of the individual battery cells, more precisely of the cell branches with the respective galvanic cells, thus occurs not exclusively based on which performance requirement the respective electric drive of the motor vehicle has at a given time. In addition, a particularly favorable temperature management at the cell level can also be implemented, in that, in a temperature dependent manner, it is decided for the individual battery cells which ones should be switched on and off for the energy supply of the electric drive at a given time. In this manner, a particularly gentle operation of the individual battery cells is also possible, since, taking into consideration the respective temperatures of the battery cells, an overheating of the battery cells can be prevented. As a result, both the performance and the useful life of the individual battery cells and thus of the entire battery can be improved.

Another advantageous embodiment of the invention provides that the control device is configured to actuate the switching elements of the cell branches for opening or closing the switching elements in such a manner that, in adjacent battery cells of different cell blocks, the switching elements are switched oppositely. This makes it possible to prevent directly adjacent battery cells of different cell blocks from heating each other excessively. Indeed, directly adjacent battery cells of different cell blocks are preferably not actively switched simultaneously. Thus, in directly adjacent battery cells of different cell blocks, no current flow through the respective cell branch occurs, so that these directly adjacent battery cells of different cell blocks do not heat each other excessively. This results in a particularly advantageous temperature management during the operation of the battery.

According to another advantageous embodiment of the invention, it is provided that the control device is configured to actuate the switching elements of the cell branches for opening or closing the switching elements as a function of the respective state of charge of the battery cells. In this manner, it is possible, among other things, to discharge the individual batteries particularly uniformly. Thus, a uniform electrical charge distribution of all the galvanic cells of the battery can be reliably ensured. Thus, the full capacity of the battery can then be used and the temporal change of the individual battery cells or the aging can be counteracted.

In another advantageous design of the invention, it is provided that the control device is configured to actuate the switching elements of the cell branches for opening or closing the switching elements as a function of the state of health of the battery cells. In other words, the so-called state of health, abbreviated SOH, of the individual battery cells is thus taken into consideration by the control device. Thus, the control device can in each case switch the individual battery cells on or off in such a manner that the battery cells age uniformly. In particular, for this purpose, the control device can take into consideration, for example, characteristic variables such as a respective internal resistance, a respective capacitance, a respective voltage, a number of charging and discharging cycles and the like at the battery cell level. Due to the uniform aging of the battery cells, the performance capability and the useful life of the entire battery can be increased overall.

Another advantageous design of the invention provides that, for each cell block, in at least one of the battery cells, in the respective battery cell housing, a bypass branch for bypassing the galvanic cell is arranged, which comprises a bypass switching element for opening and closing the bypass branch, wherein, in order to bypass all the cell blocks, the control device is configured to open all the switching elements for each cell block and to close the at least one bypass switching element. In this manner, that is to say due to the at least one bypass branch for each cell block, it is also possible without problem to completely bypass entire cell blocks and the battery cells connected in parallel therein. Preferably, in all the battery cell housings, a bypass branch for bypassing the respective galvanic cell is arranged, which has a bypass switching element for opening and closing the bypass branch, wherein, in order to bypass all the cell blocks, for each cell block, the control device is arranged to open all the switching elements and to close several and preferably all of the bypass switching elements. Since preferably every battery cell has such a bypass branch, in the case of bypassing of all the cell blocks, it is possible to distribute the current flow over several battery cells, more precisely via the respective bypass branches. This results in a relatively low resistance in the respective bypassed cell block, thus also entailing low heat development.

According to another advantageous embodiment of the invention, it is provided that the battery cells in each case comprise at least one sensor for the acquisition of at least one operating parameter of the battery cells, which is designed to transmit data concerning the operating parameter to the control device. In the battery cells, multiple sensors can also be integrated, which can be designed, for example, to measure respective voltages, currents, internal cell pressures and the like in the respective battery cells. For each battery cell of the battery, data representing important operating parameters during the operation of the battery is thus preferably present. In this manner, the control device can switch on and bypass the individual battery cells in a targeted manner in order to meet the respective performance requirement of the respective electric drive of the motor vehicle in which the battery is used.

The motor vehicle according to the invention comprises the battery according to the invention and an advantageous embodiment of the battery according to the invention.

In the method according to the invention for operating the battery according to the invention or an advantageous embodiment of the battery according to the invention, by means of the control device of the battery, the switching elements of the cell branches are actuated for opening or closing the switching elements are actuated as a function of a performance requirement of an electric drive of the motor vehicle. Advantageous designs of the battery according to the invention should be considered advantageous designs of the method according to the invention and vice versa, wherein the battery comprises in particular means for carrying out the method steps.

BRIEF DESCRIPTION OF DRAWINGS

Additional features, advantages and details of the invention result from the following description of preferred embodiment examples as well as in reference to the drawing. The features and combinations of features mentioned above in the description and the features and combination of features mentioned below in the description of the figures and/or shown in the figures alone can be used not only in the respective indicated combination but also in other combinations or alone without going beyond the scope of the invention.

The drawing shows in.

In the figures, identical or functionally equivalent elements are provided with identical reference numerals.

DETAILED DESCRIPTION

Figure 1:
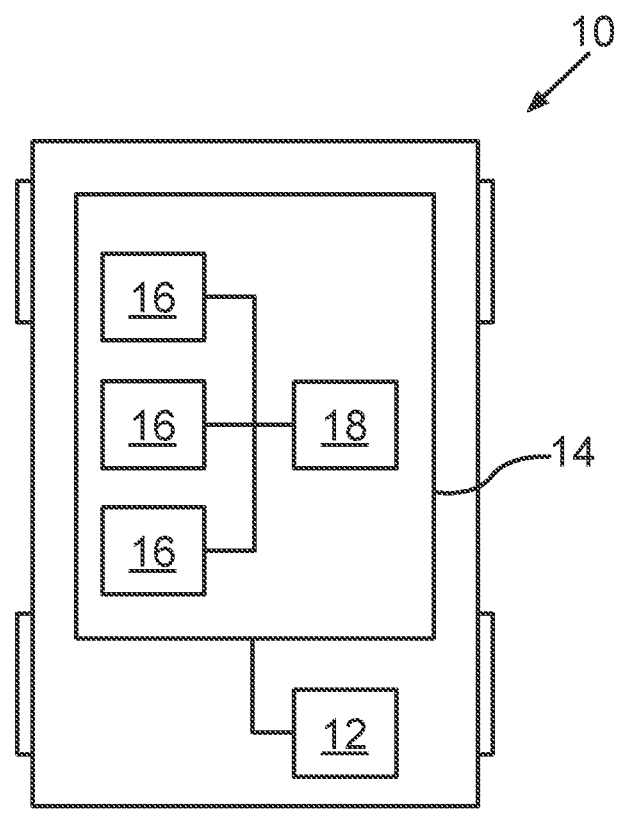
FIG. 1 a diagrammatic representation of a motor vehicle with a battery for the energy supply of an electric drive of the motor vehicle, wherein the battery comprises multiple cell blocks and a control device which is configured to switch on or bypass respective battery cells, not represented, of the cell blocks as a function of a performance requirement of the electric drive.

A motor vehicle 10 with an electric drive 12 is shown in a diagrammatic representation in FIG. 1. The motor vehicle 10 comprises a battery 14 which is used for the energy supply of the electric drive 12. The battery 14 comprises multiple diagrammatically indicated cell blocks 16 and a control device 18 which is configured to bypass and switch on individual battery cells, not represented here, of the respective cell blocks 16 depending on the performance requirement of the electric drive 12.

Figure 2:
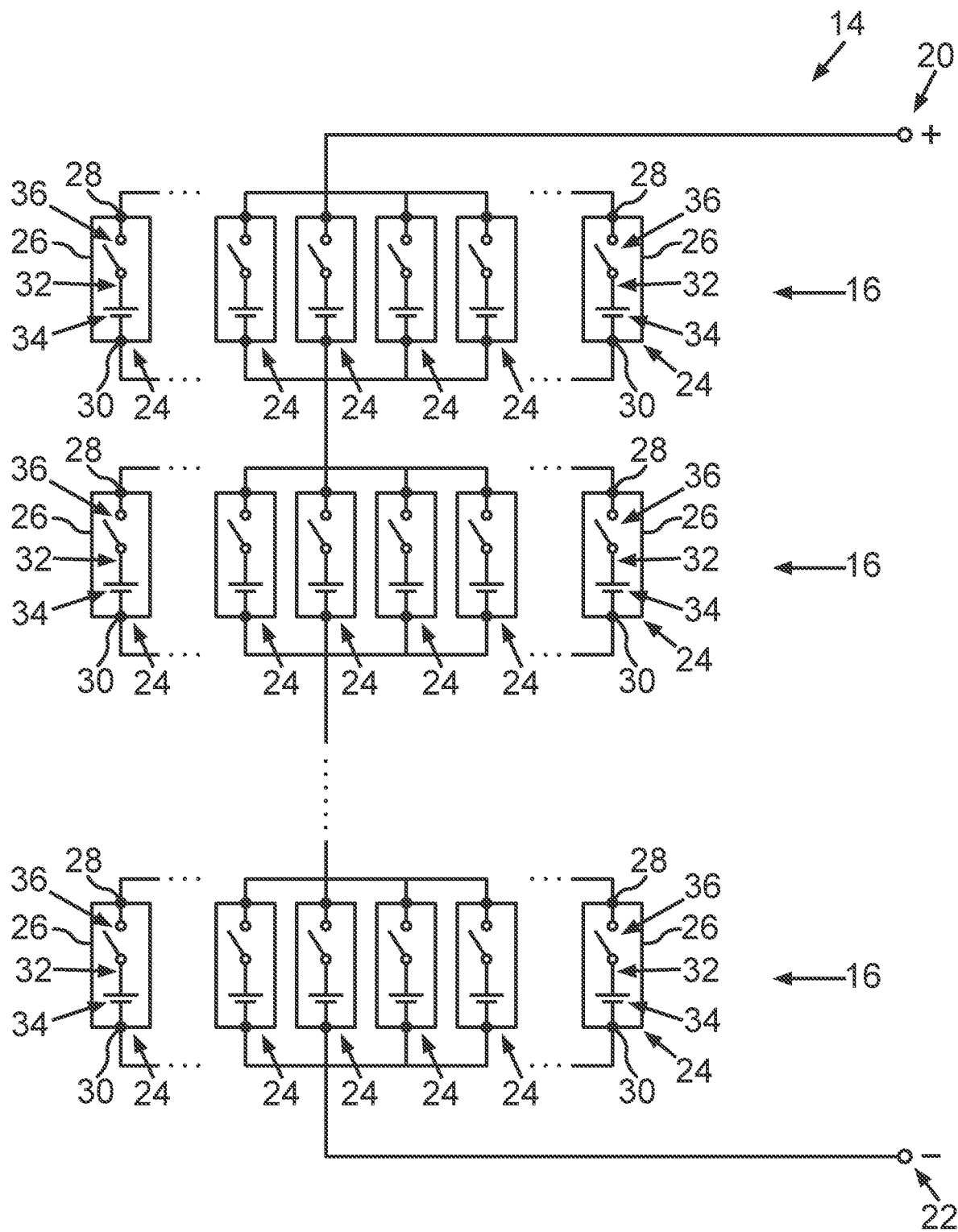
FIG. 2 a diagrammatic representation of a first embodiment of the battery, wherein multiple series-connected cell blocks are represented, which comprise multiple parallel-connected battery cells in which in each case a switching element for interrupting a current flow at the cell level is integrated.

In FIG. 2, a first embodiment of the battery 14 is represented diagrammatically. Here, several of the cell blocks 16 are series-connected, so that the individual voltages of the cell blocks 16 add up to a total voltage between a positive pole 20 and a negative pole 22 at the level of the battery overall.

The individual cell blocks 16 comprise multiple battery cells 24 connected in parallel to one another. The respective battery cells 24 comprise respective battery cell housings 26 with electric terminals 28, 30 via which the individual battery cells 24 are electrically connected to one another. In each case, in the battery cell housings 26, a cell branch 32 connecting the terminals 28, 30, with a galvanic cell 34, is arranged. Each of the cell branches 32 in addition comprises a switching element 36 for opening and closing the respective cell branch 32, so that a current flow via or through the galvanic cell 34 can be enabled or prevented.

The control device 18 mentioned in connection with FIG. 1 is configured to actuate the individual switching elements 36 of the cell branches 32 for opening or closing the switching elements 36 as a function of a respective performance requirement of the electric drive 12 of the motor vehicle 10. This can occur, for example, in a centralized manner by the control device 18, wherein this can also occur, for example, in a decentralized manner by individual microcontrollers, not represented here, which belong to the control device 18.

The control device 18 can thus open for each cell block 16 all the switching elements 36 except for one as a function of the performance requirement of electric motor 12, so that, in the case of the lowest performance requirement and thus the lowest power provision by the battery 14, in each case only one of the galvanic cells 34, which can be, for example, lithium ion cells or also fuel cells, is used for the energy provision. Due to the series connection of the individual cell blocks 16 it is necessary that for each cell block 16 at least one of the switching elements 36 is thus closed, so that a current flow from the positive pole 20 to the negative pole 22 of the overall battery 14 can occur. Naturally, depending on the performance requirement of the electric drive 12, several of the switching elements 36 can be closed. For example, if a driver of the motor vehicle 10 fully depresses a gas pedal, then all the switching elements 36 can be closed, so that the maximum power can be provided by means of the battery 14.

In addition, the control device 18 can also actuate the respective switching elements 36 inside the cell for opening or closing as a function of a respective temperature of the individual battery cells 24. In view of the actual performance requirement of the electric motor 12, a respective temperature at the cell level is thus also taken into consideration in this manner, so that, for example, hot spots within the battery 14 can be avoided, in that the individual battery cells 24 are used alternatingly for the energy supply, so that the individual battery cells 24 during the use in the motor vehicle 10 can also cool off again sufficiently before they are used again for the energy supply.

Thus, the control device 18 can actuate, for example, the switching elements 36 of the cell branches 32 for opening or closing the switching elements 36 in such a manner that, in adjacent battery cells 24 of different cell blocks 16, the respective switching elements 36 are always switched oppositely. In this manner, in immediately adjacent battery cells 24 of different cell blocks 16, current is prevented from flowing simultaneously through the two adjacent battery cells 24. Thereby, an unfavorable thermal heating up or mutually thermal influencing of adjacent battery cells 24 in different cell blocks 16 is prevented.

In addition, the control device 18 can also take into consideration respective states of charge of the individual battery cells 24 and actuate the respective switching elements 36 as a function thereof in such a manner that the individual battery cells 24 are discharged as uniformly as possible. Furthermore, the control device 18 can also take into consideration a respective state of health of the individual battery cells 24 in the actuation of the switching elements 36. In this manner, the control device 18 can ensure that the individual batteries 24 age at least substantially uniformly, which has a positive effect on the performance capability and the useful life of the entire battery 14.

Figure 3:
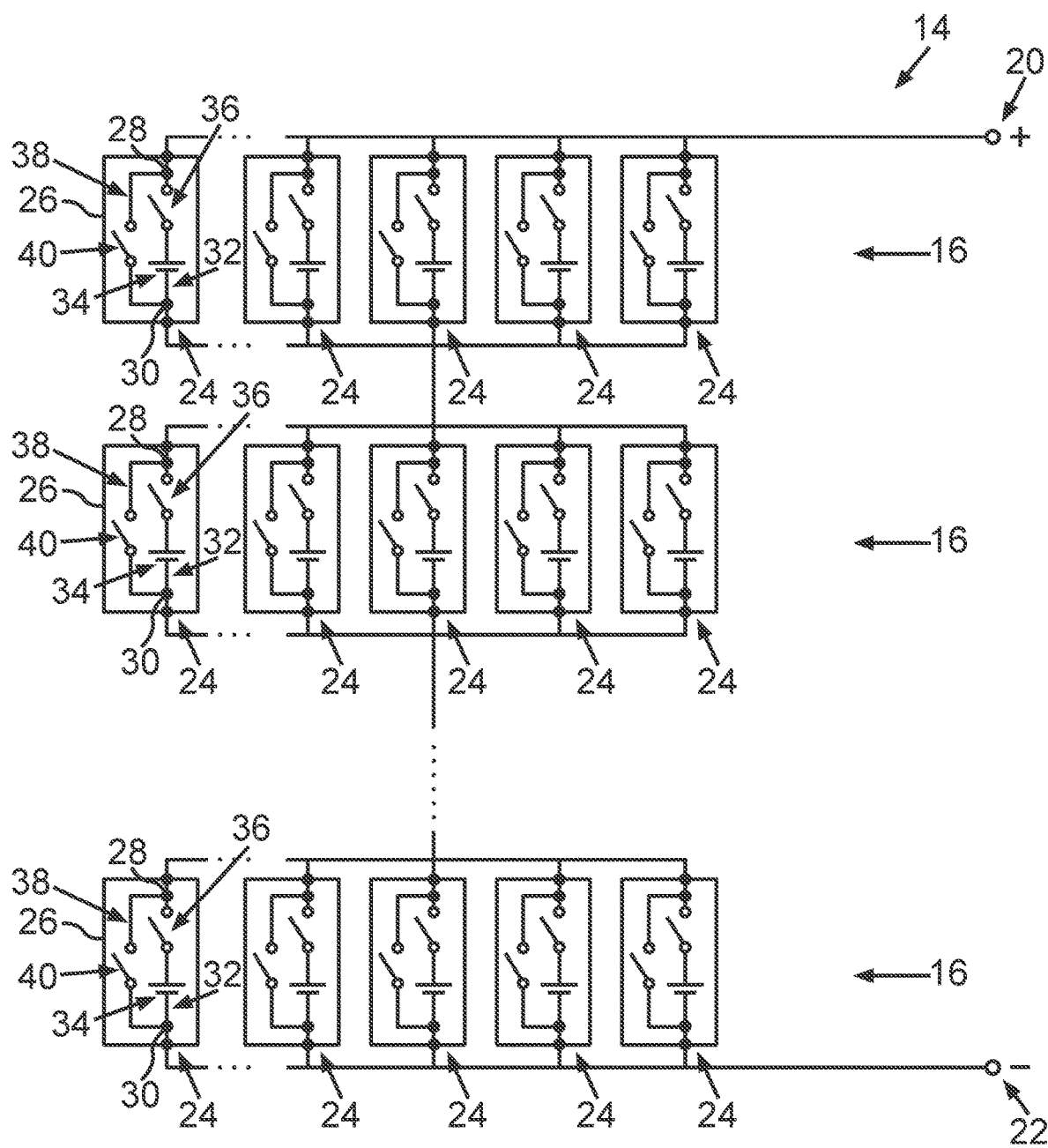
FIG. 3 a diagrammatic representation of another embodiment of the battery, wherein this embodiment differs from the embodiment shown in FIG. 2 in that each of the battery cells comprises another bypass branch.

In FIG. 3, another possible embodiment of the battery 14 is represented diagrammatically. The embodiment shown here differs from the embodiment shown in FIG. 2 in that, in addition, a bypass branch 38 for bypassing the respective galvanic cells 34 is arranged in all the battery cell housings 26. Each of the bypass branches 38 comprises a bypass switching element 40 for opening and closing the bypass branch 38. In order to bypass all the cell blocks 16, the control device 18 is configured to open, for each cell block 16, all the switching elements 36 and to close at least one of the bypass switching elements 40. In the embodiment of the battery 14 shown in FIG. 3, it is also possible, without problem, to bypass all the cell blocks 16 by corresponding actuation of the switching elements 36 and of the bypass switching elements 40 in such a manner that, in the cell blocks 16 in question, no current flow via the galvanic cells 34 occurs. This is possible without problem due to said bypass branches 38. Thus, if, for example, one of the cell blocks 16 is to be bypassed completely, then the control device 18 actuates the switching elements 36 in the cell block 16 in question in such a manner that they are all opened, wherein, in addition, the control device 18 actuates, for example, all the bypass switching elements 40 in such a manner that they are closed. In this case, a current distributed over all the battery cells 24 of the cell block 16 to be bypassed can flow via the respective bypass branches 38.

By bypassing individual cell blocks 16, for example, in an eco operating mode of the motor vehicle 10 in question, all the cell blocks 16 can thus be switched off, as a result of which the voltage level of the battery 14 is lowered in accordance with the cell blocks 16 that are switched off. Thus, at the cell block level, all the battery cells 24 located in the cell block 16 in question can be spared in a simple manner.

If, in the meantime, it has then become necessary to provide, for example, the full power by means of the battery 14, then the control device 18, can close all the switching elements 36 in all the cell blocks 16 and open all the bypass switching elements 40, as a result of which the maximum power can be provided by means of the battery 14.

In the embodiment of the battery 14 shown in FIG. 3 as well, it is possible, in addition to the actual performance requirement of the electric drive 12, also to take into consideration respective temperatures, states of charge, aging states or states of health at the cell level. The embodiments of the battery 14 shown in FIG. 2 and in FIG. 3 can both comprise at the cell level one or more sensors which can measure a wide variety of operating parameters of the respective battery cells 24, such as, for example, voltages, currents, internal cell pressures and the like, and transmit associated data to the control device 18.

Thus, knowing the respective operating parameters of the battery cells 24, the control device 18 can switch the respective battery cells 24 on or off for the respective energy provision. Overall, at the cell level, the different embodiments of the battery 14 thus offer the possibility of reacting in a particularly flexible manner to respective performance requirements of the electric drive 12, on the one hand, and of switching the individual battery cells 24 on and off at the cell level, on the other hand, so that the individual battery cells 24 experience a particularly optimal temperature management, uniform discharging and uniform aging.

The invention claimed is:

1. A battery for a motor vehicle, comprising:
a plurality of cell blocks, each cell block formed by connecting a plurality of battery cells in parallel,
wherein each battery cell of each plurality of battery cells comprises a battery cell housing with electric terminals by which each plurality of battery cells are electrically connected to one another;
wherein each of the battery cell housings contain therein a galvanic cell and a cell branch which connects the galvanic cell to the electric terminals;
wherein each cell branch has a switching element for opening and closing the cell branch;
wherein the battery has a control device which is configured to actuate the switching elements of the cell branches as a function of a performance requirement of an electric drive of the motor vehicle;
wherein, for each of the plurality of cell blocks, in at least one of the plurality of battery cells, a bypass branch is arranged in the battery cell housing for bridging the galvanic cell, the bypass branch comprising a bridging switching element for opening and closing the bypass branch; and
wherein, for bridging all of the plurality of cell blocks, for each of the plurality of cell blocks, the control device is configured to open all the switching elements and to close the at least one bridging switching element.

2. The battery according to claim 1, wherein the control device is configured to actuate the switching elements of the cell branches as a function of a respective temperature of the pluralities of battery cells.

3. The battery according to claim 1, wherein the control device is configured to actuate the switching elements of the cell branches in such a manner that, in adjacent battery cells of different cell blocks, the switching elements are switched oppositely.

4. The battery according to claim 1, wherein the control device is configured to actuate the switching elements of the cell branches as a function of a respective state of charge of the pluralities of battery cells.

5. The battery according to claim 1, wherein the control device is configured to actuate the switching elements of the cell branches as a function of a state of health of the pluralities of battery cells.

6. The battery according to claim 1, wherein the bypass branch is provided in the battery cell housing of each and every battery cell,
wherein the control device is configured, for bridging all of the plurality of cell blocks, for each of the plurality of cell blocks, to open all the switching elements and to close all of the bridging switching elements.

7. The battery according to claim 1, wherein the each and every battery cell further comprises at least one sensor for the acquisition of at least one operating parameter of the battery cell, which is designed to transmit data concerning the operating parameter to the control device.

8. A method for operating a battery according to claim 1, comprising:
the control device of the battery, as a function of the performance requirement of the electric drive of the motor vehicle, actuates the switching elements of the cell branches for opening or closing the switching elements.

* * * * *